April 10, 1934.   J. TRUPPE ET AL   1,954,505
PNEUMATIC TIRE
Filed Sept. 27, 1933
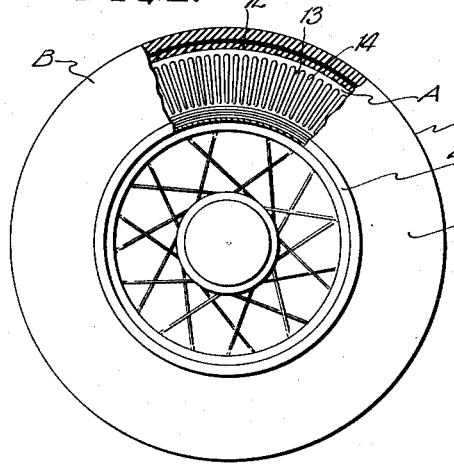
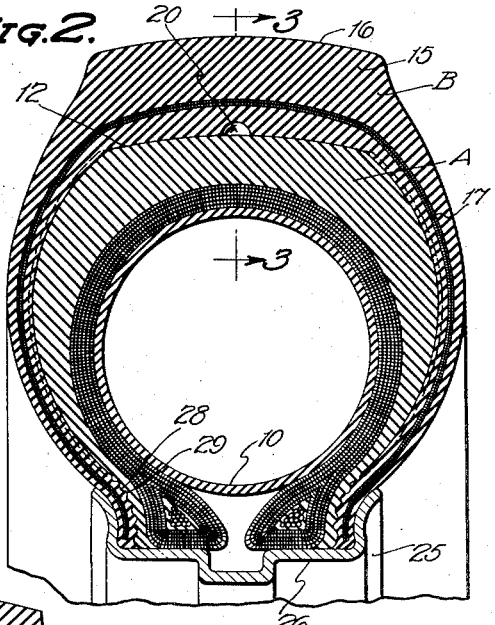
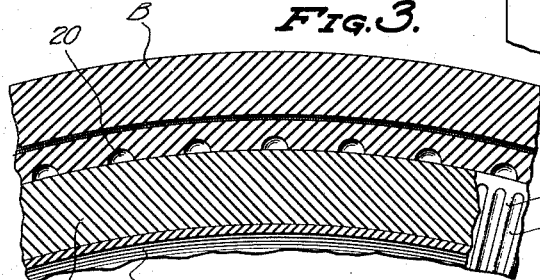
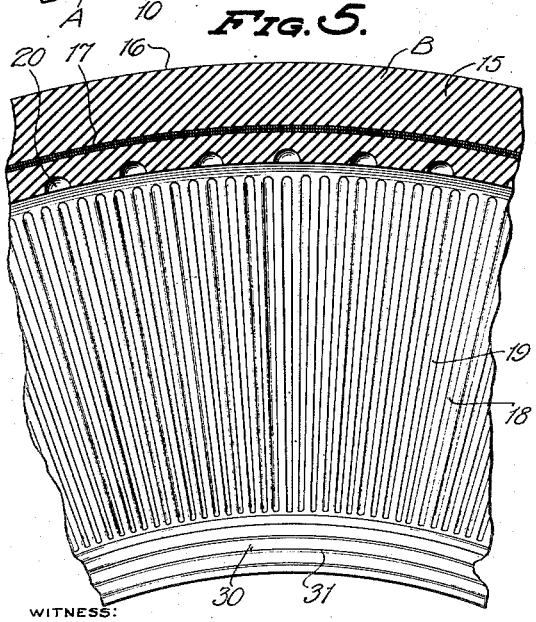
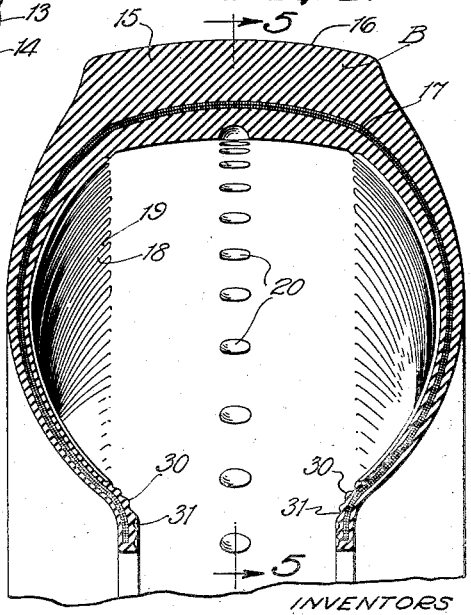
INVENTORS
JOHN TRUPPE
CHARLES BUHLMAN.
BY Ely Pattison
ATTORNEYS
WITNESS:

Patented Apr. 10, 1934

1,954,505

UNITED STATES PATENT OFFICE 1,954,505

PNEUMATIC TIRE

John Truppe and Charles Buhlman, Brooklyn, N. Y.

Application September 27, 1933, Serial No. 691,112

1 Claim. (Cl. 152—13)

This invention relates to new and useful improvements in pneumatic tires.

It is one object of the invention to provide a new and novel construction involving two separate elements removably attached to one another to provide a tire, one of the elements being in the form of a main tire body and the other element in the form of a protective shoe or casing.

It is another object of the invention so to construct the pneumatic tire that the aforesaid protective shoe or casing may be readily detached for the purpose of replacement when the same has become worn or otherwise unfit for use.

A further object of the invention resides in a novel construction whereby relative movement either radially or circumferentially between the two members is prevented in use.

Other objects of the invention will appear as the nature of the invention is better understood from the following description together with reference to the accompanying drawing, wherein;

Figure 1 is a view in side elevation partly broken away illustrating a wheel having a tire constructed in accordance with the present invention mounted thereon, Figure 2 is a transverse sectional view on an enlarged scale of the tire, Figure 3 is a vertical sectional view taken on the line 3—3 of Figure 2, Figure 4 is a transverse sectional view of a portion of the protective shoe or casing, and;

Figure 5 is a fragmentary circumferential sectional view of the protective shoe or casing.

Referring more particularly to the drawing, a tire constructed in accordance with the present invention consists of a main tire body A, and a protective shoe or casing B.

The main tire body A, may be of any preferred internal construction and carries a pneumatic tube 10, which tube may be of conventional form. The tire body A, differs from pneumatic tires of conventional form in that instead of being formed with a roughened tread surface as is the common practice, it is formed with a relatively smooth narrow peripheral face 12. Another distinguishing feature of the tire body A, consists in the provision upon the outer face of the side walls thereof of a plurality of alternately arranged ribs and channels which extend radially of the said side walls. In Figure 3, these ribs are designated 13 and the channels 14.

The protective shoe or casing B consists of a member so formed as to enclose the tire body A, and it is formed with a thickened tread 15, the surface 16 of which may be of any desired traction producing form. This protective shoe or casing may also be provided with an internal reinforcement 17. The inner faces of the side walls of the protective shoe or casing B, are formed with alternately disposed ribs and channels 18 and 19 respectively, and the ribs 18 of the protective shoe or casing are adapted to be received in the channels 14, of the tire body when the protective shoe or casing is placed thereon, it being understood that the ribs 13, of the tire body will engage in the channels 19, on the inner face of the protective shoe or casing. By this means, when the two parts are assembled circumferential movement thereof relative to each other is prevented, and in addition to the aforedescribed means, circumferential movement of the two members relative to each other is prevented by means of vacuum cups 20, formed in a peripheral series upon the inner peripheral face of the protective shoe or casing B. These vacuum cups 20 act in conjunction with the smooth peripheral face 12 of the tire body A, and as aforestated prevent relative circumferential movement of the parts.

When the parts are in assembled position, the side walls of the protective tire shoe or casing extend to the base of the bead of its respective side of the tire body, as best illustrated in Figure 2, and together with the beads of the tire body, the sides of the protective shoe or casing are adapted to engage behind the flanges 25, of the wheel rim 26.

To maintain the inner edges of the sides of the protective shoe or casing in position behind the flanges 25, and also to prevent radial movement of the protective shoe or casing relative to the tire body the outer face of the beads of the tire body are provided with a plurality of alternately disposed circumferentially extending ribs and channels 28, and 29, respectively, and these ribs and channels are adapted to engage with ribs and channels 30, and 31, respectively, which extend circumferentially of the inner face of the protective shoe or casing near the inner edges thereof, as best illustrated in Figure 5.

In assembling the tire, the tire body A, is deflated by deflating the inner tube 10. With the tire body in its deflated condition the protective shoe or casing is passed over the same, after which the tire body is inflated to expand the same and cause it to conform in shape to the interior of the protective shoe or casing and to cause interengagement of the ribs and channels 13 and 14 with the ribs and channels 18 and 19 and the ribs and channels 28 and 29 with the ribs and channels 30 and 31. This inflation of the tire body also causes the vacuum cups 20 to function and by these several devices both circumferential and radial movement of the protective shoe or casing relative to the tire body are prevented.

From the foregoing it will be apparent that the present invention provides a new and novel pneumatic tire which, when the protective shoe or casing thereof becomes worn to a point beyond further use, it may be simply and easily removed and replaced by another protective shoe or casing to provide another pneumatic tire, and furthermore, this operation may be repeated many times, thus greatly reducing the cost of pneumatic tires, since the protective shoe or casing can be manufactured at a cheaper cost than can an entire pneumatic tire.

While the invention has been herein disclosed in its preferred form, it is to be understood that it is not limited to the specific construction herein shown and that it may be practiced in other forms without departing from the scope of the pending claim.

Having thus described the invention, what is claimed as new and what it is desired to secure by Letters Patent of the United States, is:

A pneumatic tire comprising in combination, a main tire body having beads defining its inner peripheral edge, a plurality of radially extending ribs extending throughout substantially the entire width of the side walls of the main tire body, a plurality of circumferentially extending ribs projecting from the outer face of the beads of the main tire body, and a renewable protective casing adapted to completely enclose the main tire body including its beads, and conforming in shape thereto, a plurality of radially extending ribs projecting from the inner face of the side walls of the protective casing and adapted for interengagement with the radially extending ribs of the main tire body to prevent circumferential movement of the protective casing relative to the main tire body, and a plurality of circumferentially extending ribs on the inner face of the protective casing adapted for interengagement with the circumferentially extending ribs on the beads of the main tire body to prevent radial movement of the protective casing relative to the main body portion.

JOHN TRUPPE.
CHARLES BUHLMAN.